(12) United States Patent
Pisu et al.

(10) Patent No.: US 11,597,192 B2
(45) Date of Patent: Mar. 7, 2023

(54) MULTILAYER RADAR-ABSORBING LAMINATE FOR AIRCRAFT MADE OF POLYMER MATRIX COMPOSITE MATERIAL WITH GRAPHENE NANOPLATELETS, AND METHOD OF MANUFACTURING SAME

(71) Applicant: LEONARDO S.P.A., Rome (IT)

(72) Inventors: Luigi Pisu, Turin (IT); Gianni Iagulli, San Severo (IT); Maria Sabrina Sarto, Rome (IT); Fabrizio Marra, Rome (IT); Julian Lecini, Capena (IT); Alessio Tamburrano, Ciampino (IT)

(73) Assignee: LEONARDO S.P.A., Rome (IT)

( * ) Notice: Subject to any disclaimer, the term of this patent is extended or adjusted under 35 U.S.C. 154(b) by 312 days.

(21) Appl. No.: 16/976,988

(22) PCT Filed: Mar. 1, 2019

(86) PCT No.: PCT/IB2019/051656
§ 371 (c)(1),
(2) Date: Aug. 31, 2020

(87) PCT Pub. No.: WO2019/167009
PCT Pub. Date: Sep. 6, 2019

(65) Prior Publication Data
US 2021/0001610 A1 Jan. 7, 2021

(30) Foreign Application Priority Data
Mar. 1, 2018 (IT) .................... 102018000003182

(51) Int. Cl.
*B32B 27/12* (2006.01)
*B29C 70/02* (2006.01)
(Continued)

(52) U.S. Cl.
CPC ............ *B32B 27/12* (2013.01); *B29C 70/025* (2013.01); *B29C 70/882* (2013.01); *B32B 17/04* (2013.01);
(Continued)

(58) Field of Classification Search
CPC ... B29C 70/025; B29C 70/443; B29C 70/882; B32B 2307/212; B32B 2262/106;
(Continued)

(56) References Cited

U.S. PATENT DOCUMENTS 8,772,729 B1\* 7/2014 Brown ................... B82Y 30/00
250/370.07
11,362,431 B1\* 6/2022 Yo .......................... H01Q 17/00
(Continued)

FOREIGN PATENT DOCUMENTS

EP   3050916 A1   8/2016
EP   3235632 A1   10/2017
(Continued)

OTHER PUBLICATIONS

International Search Report for International Patent Application No. PCT/IB2019/051656, dated Jul. 8, 2019.
(Continued)

*Primary Examiner* — Tri V Nguyen
(74) *Attorney, Agent, or Firm* — Armstrong Teasdale LLP

(57) ABSTRACT

A multilayer radar-absorbing laminate includes three juxtaposed blocks.
A first electrically conductive block is arranged toward the inside of the aircraft in use.
A second electromagnetic intermediate absorber block has a layer of electrically non-conductive fiber sheets is permeated by graphene-based nanoplatelets to achieve a periodic and electromagnetically subresonant layer, the conductive layers containing graphene nanoplatelets alternating with non-conductive layers.
(Continued)

A third block of electrically non-conductive material is arranged towards the outside and forms part of the outer surface of the aircraft. The second block is produced by depositing on the fiber sheets a suspension of graphene nanoplatelets in a polymeric mixture, with controlled penetration of the graphene nanoplatelets into the fiber sheets. A plurality of dry fiber sheets sprayed with the suspension of graphene nanoplatelets is superimposed. An unpolymerized thermosetting synthetic resin is infused into a lay-up made of the first, second and third blocks. Afterwards, the thermosetting resin is polymerized.

16 Claims, 5 Drawing Sheets

(51) Int. Cl.
```
B29C 70/88    (2006.01)
B32B 17/04    (2006.01)
C08J 5/24     (2006.01)
B82Y 30/00    (2011.01)
B82Y 40/00    (2011.01)
```
(52) U.S. Cl.
CPC .............. *C08J 5/243* (2021.05); *C08J 5/244* (2021.05); *C08J 5/249* (2021.05); *B32B 2262/106* (2013.01); *B32B 2264/108* (2013.01); *B32B 2264/201* (2020.08); *B32B 2264/302* (2020.08); *B32B 2307/202* (2013.01); *B32B 2307/212* (2013.01); *B32B 2605/18* (2013.01); *B82Y 30/00* (2013.01); *B82Y 40/00* (2013.01)

(58) Field of Classification Search
CPC ........ B32B 2264/201; B32B 2264/302; B32B 2264/108; B32B 2307/202; B32B 2605/18; H01Q 17/00; C08J 5/243; C08J 5/244; C08J 5/249; C08J 5/04; C08J 5/005
USPC ..................... 428/299.7, 300.7, 301.7, 300.4
See application file for complete search history.

(56) References Cited

U.S. PATENT DOCUMENTS

| | | |
|---|---|---|
| 2004/0188890 A1 | 9/2004 | Sheridan et al. |
| 2011/0281034 A1 | 11/2011 | Lee et al. |
| 2013/0034724 A1 | 2/2013 | Sodano |
| 2015/0166743 A1 | 6/2015 | Restuccia et al. |

FOREIGN PATENT DOCUMENTS

| | | |
|---|---|---|
| KR | 20130010285 A | 1/2013 |
| WO | 2014061048 A3 | 4/2014 |

OTHER PUBLICATIONS

H. K. Jang et al., Semi-cylindrical Radar Absorbing Structures using Fiber-reinforced Composites and Conducting Polymers in the X-band, Advanced Composite Materials, Published online Apr. 2, 2012, pp. 215-229, vol. 20, Issue 3, Koninklijke Brill NV, Leiden, NL.
K. Y. Park, et al., Application of MWNT-added glass fabric/epoxy composites to electromagnetic wave shielding enclosures, Composite Structures, Science Direct, Dec. 2007, pp. 401-406, vol. 81, Issue 3, Elsevier.
I. M. De Rosa et al., EMC Impact of Advanced Carbon Fiber/Carbon Nanotube Reinforced Composites for Next-Generation Aerospace Applications, IEEE Transactions on Electromagnetic Compatibility, Aug. 2008, pp. 556-563, vol. 50, No. 3, IEEE, USA.
I. M. De Rosa et al., Electromagnetic Design and Realization of Innovative Fiber-Reinforced Broad-Band Absorbing Screens, Aug. 2009, pp. 700-707, IEEE Transactions on Electromagnetic Compatibility, vol. 51, No. 3, IEEE, USA.
S. E. Lee, et al., Fabrication and design of multi-layered radar absorbing structures of MWNT-filled glass/epoxy plain-weave composites, Composite Structures, Science Direct, Dec. 2006, pp. 397-405, vol. 76, Issue 4, Elsevier.
I. Choi et al., Radar absorbing composite structures dispersed with nano-conductive particles, Composite Structures, Science Direct, Apr. 2015, pp. 23-30, vol. 122, Elsevier Ltd.
W. K. Jung, et al., Fabrication of radar absorbing structure (RAS) using GFR-nano composite and spring-back compensation of hybrid composite RAS shells, Composite Structures, Sep. 2006, pp. 571-576, vol. 75, Issues 1-4, Elsevier.
J. B. Kim, Broadband radar absorbing structures of carbon nanocomposites, Advanced Composite Materials, Aug. 2012, pp. 333-344, vol. 21, Issue 4, Taylor and Francis Ltd., UK.
J. H. Oh, K. S. Oh, C. G. Kim, and C. S. Hong, Design of radar absorbing structures using glass/epoxy composite containing carbon black in X-band frequency ranges, Composites Part B: Engineering, Jan. 2004, pp. 49-56, vol. 35, Issue 1, Elsevier.
G. Lubineau and A. Rahaman, A review of strategies for improving the degradation properties of laminated continuous-fiber/epoxy composites with carbon-based nanoreinforcements, Carbon, Jun. 2012, pp. 2377-2395, vol. 50, Issue 7, Elsevier Ltd.
A. Saib et al., Carbon Nanotube Composites for Broadband Microwave Absorbing Materials, IIEEE Transactions on Microwave Theory and Techniques, Jun. 2006, pp. 2745-2754, vol. 54, No. 6, IEEE, USA.
F. Meng et al., Graphene-based microwave absorbing composites: A review and prospective, Composites Part B: Engineering, Mar. 15, 2018, pp. 260-277, vol. 137, Elsevier Ltd.
Umer, Y. Li, Y. Dong, H. J. Haroosh, and K. Liao, The effect of graphene oxide (GO) nanoparticles on the processing of epoxy/glass fiber composites using resin infusion, The International Journal of Advanced Manufacturing Technology, Dec. 2015, pp. 2183-2192, vol. 81, Issue 9-12, Springer-Verlag London, UK.
N. T. Kamar, M. M. Hossain, A. Khomenko, M. Haq, L. T. Drzal, and A. Loos, Interlaminar reinforcement of glass fiber/epoxy composites with graphene nanoplatelets, Composites Part A: Applied Science and Manufacturing, Mar. 2015, pp. 82-92, vol. 70, Elsevier Ltd.
R. K. Prusty, S. K. Ghosh, D. K. Rathore, and B. C. Ray, Reinforcement effect of graphene oxide in glass fiber/epoxy composites at in-situ elevated temperature environments: An emphasis on graphene oxide content, Composites Part A: Applied Science and Manufacturing, Apr. 2017, pp. 40-53, vol. 95, Elsevier Ltd.
A. K. Pathak, M. Borah, A. Gupta, T. Yokozeki, and S. R. Dhakate, Improved mechanical properties of carbon fiber/graphene oxide-epoxy hybrid composites, Composite Science and Technology, Oct. 27, 2016, pp. 28-38, vol. 135, Elsevier Ltd.
W. Qin, F. Vautard, L. T. Drzal, and J. Yu, Mechanical and electrical properties of carbon fiber composites with incorporation of graphene nanoplatelets at the fiber-matrix interphase, Composites Part B: Engineering, Feb. 2015, pp. 335-341, vol. 69, Elsevier Ltd.
M. S. Sarto, A. G. D'Aloia, A. Tamburrano, and G. De Bellis, Synthesis, Modeling, and Experimental Characterization of Graphite Nanoplatelet-Based Composites for EMC Applications, IEEE Transactions on Electromagnetic Compatibility, Feb. 2012, pp. 17-27, vol. 54, Issue 1, IEEE, USA.
A. G. D'Aloia, M. D. Amore, and M. S. Sarto, Adaptive Broadband Radar Absorber Based on Tunable Graphene, IEEE Transactions on Antennas and Propagation, Jun. 2016, pp. 2527-2531, vol. 64, No. 6, IEEE, USA.
F. Marra et al., Electromagnetic and Dynamic Mechanical Properties of Epoxy and Vinylester-Based Composites Filled with Graphene Nanoplatelets, Polymers, Jul. 2016, vol. 8, No. 8, 272, MDPI, Basel, Switzerland.

\* cited by examiner

MULTILAYER RADAR-ABSORBING LAMINATE FOR AIRCRAFT MADE OF POLYMER MATRIX COMPOSITE MATERIAL WITH GRAPHENE NANOPLATELETS, AND METHOD OF MANUFACTURING SAME

CROSS-REFERENCE TO RELATED APPLICATIONS

This application is a National Stage Application of International Patent Application No. PCT/IB2019/051656, having an International Filing Date of Mar. 1, 2019, which claims the benefit of priority to Italian Patent Application No. 102018000003182, filed Mar. 1, 2018, the entire contents of which are hereby incorporated by reference herein.

FIELD OF THE INVENTION

The present invention falls in the field of radar-absorbing aeronautical materials, i.e. materials with radio-frequency electromagnetic radiation absorption properties. In particular, the invention refers to radar-absorbing broadband multilayer laminates made of composite material laminated to a polymeric matrix containing graphene nanoplatelets. As an indication, the multilayer laminates described here may be used to make components or parts of the aircraft typically most exposed to radar radiation in the frontal sector, such as wing leading edges, nacelles, pylons, air intakes, or the so-called RCS hot spots, as well as curved panels of the fuselage, panels of wingboxes and tail empennages.

BACKGROUND OF THE INVENTION

Graphite/graphene nanoplatelets (GNP) are known to be used as fillers, in variable concentrations, in the production of polymer matrix nanocomposites having controlled properties of radio-frequency complex dielectric permittivity. The multifunctional composites that are obtained are used in electromagnetic shielding, or as radar-absorbing materials (RAM).

From patent publication WO 2014/061048 A2, a procedure is known for making polymeric nanocomposites based on graphite/graphene nanoplatelets for electromagnetic applications, such as shielding and/or energy absorption associated with electromagnetic fields. The method proposes the controlled production of nanoplatelets to be used as nanofillers in a polymeric matrix.

In particular, radar-absorbing materials are able to absorb the energy associated with an electromagnetic field, having a minimum reflection coefficient in well-defined frequency bands.

In the design of components with low radar observability, the concentration and morphological and electrical properties of the filler are appropriately selected in order to optimize the electromagnetic properties of the composite material. More in particular, one tries to widen as much as possible the frequency band wherein the material is able to absorb the energy associated with the electromagnetic field, i.e. to widen the range of frequencies at which a certain component is not very observable to radar.

To this end, the application of paints containing graphene nanoplatelets on the outer surfaces of aircraft has also been proposed, and attempts have been made to incorporate graphene nanoplatelets into the body of the component made of composite material.

In the field of aircraft construction, for the manufacture of elements made of composite material, a production process is followed, which comprises the lamination or deposition of sheets of carbon, glass or Kevlar fiber, already pre-impregnated with resin (a material called pre-preg) on a lamination tool or mold.

To introduce graphene nanoplatelets, the technique called "liquid resin infusion, LRI" or "resin transfer molding, RTM" has been proposed. This technique provides for the infusion of epoxy resin, containing graphene, in a preform. The preform is prepared by laminating a superimposition of dry fiber sheets (or "plies"), placed in a mold. Typically the materials used to make the sheets are inorganic fibers, usually glass or carbon fibers. A thermosetting liquid resin is prepared separately, which is heated and doped with graphene. The dry preform is then covered with a vacuum bag, which is either sealed around the perimeter of the preform (for the LRI process) or placed in a closed, sealed mold (for the RTM process). The air is evacuated from the porous preform before the resin is introduced. The resin is then introduced into the preform; the resin is forced to penetrate the preform due to the pressure difference between the atmospheric pressure, which acts on the resin, and the vacuum in the preform (for the LRI process); otherwise, the resin is injected under pressure into the mold (for the RTM process). Finally, a heat and pressure polymerization cycle is applied, which solidifies the resin.

It has been observed that by infusing the resin with inclusions of graphene nanoplatelets, the latter are not evenly distributed within the finished component. The "Liquid Resin Infusion" technique has not so far resulted in satisfactory results, because the resin containing the graphene, penetrating into the dry preform, is filtered by the fibers of the top sheets. Consequently, a considerable part of the graphene remains accumulated in the top area of the preform, i.e. near the resin inlet points, thus not guaranteeing that the component has uniform and controllable electromagnetic properties.

During the last decade, the development of multifunctional radar absorbing materials (RASs) made of fiber reinforced polymer composite, serving as electromagnetic (EM) absorber with structural properties, has been the focus of numerous studies. See, for example:

H. K. Jang, J. H. Shin, C. G. Kim, S. H. Shin, and J. B. Kim, "Semi-cylindrical radar absorbing structures using fiber-reinforced composites and conducting polymers in the X-band," Adv. Compos. Mater., vol. 20, no. 3, pp. 215-229, 2011;

K. Y. Park, S. E. Lee, C. G. Kim, and J. H. Han, "Application of MWNT-added glass fabric/epoxy composites to electromagnetic wave shielding enclosures," Compos. Struct., vol. 81, no. 3, pp. 401-406, 2007;

I. M. De Rosa, F. Sarasini, M. S. Sarto, and A. Tamburrano, "EMC impact of advanced carbon fiber/carbon nanotube reinforced composites for next-generation aerospace applications," IEEE Trans. Electromagn. Compat., vol. 50, no. 3 PART 1, 2008;

I. M. De Rosa, R. Mancinelli, F. Sarasini, M. S. Sarto, and A. Tamburrano, "Electromagnetic design and realization of innovative fiber-reinforced broad-band absorbing screens," IEEE Trans. Electromagn. Compat., vol. 51, no. 3 PART 2, 2009.

The microwave absorption performance of conventional RASs has been noted to be improved by the dispersion of a high weight percent (wt %) of carbon-based nanofillers in a polymer matrix. Examples may be found in the following publications:

S. E. Lee, J. H. Kang, and C. G. Kim, "Fabrication and design of multi-layered radar absorbing structures of MWNT-filled glass/epoxy plain-weave composites," Compos. Struct., vol. 76, no. 4, pp. 397-405, 2006;

I. Choi, D. Lee, and D. G. Lee, "Radar absorbing composite structures dispersed with nano-conductive particles," Compos. Struct., vol. 122, pp. 23-30, 2015;

W. K. Jung, B. Kim, M. S. Won, and S. H. Ahn, "Fabrication of radar absorbing structure (RAS) using GFR-nano composite and spring-back compensation of hybrid composite RAS shells," Compos. Struct., vol. 75, no. 1-4, pp. 571-576, 2006;

J. B. Kim, "Broadband radar absorbing structures of carbon nanocomposites," Adv. Compos. Mater., vol. 21, no. 4, pp. 333-344, 2012;

J. H. Oh, K. S. Oh, C. G. Kim, and C. S. Hong, "Design of radar absorbing structures using glass/epoxy composite containing carbon black in X-band frequency ranges," Compos. Part B Eng., vol. 35, no. 1, pp. 49-56, 2004.

However, the implemented methods reported so far have several disadvantages and limitations in terms of fabrication, performance, and practical applicability at industrial scale, because of high viscosity and inhomogeneous mechanical and electrical properties mainly arising from the formation of nanofiller agglomeration and non-uniform distribution.

An extensive review on the use of carbon-based nano-reinforcement to improve the degradation properties of laminated continuous-fiber/epoxy composites is reported in the following publications:

G. Lubineau and A. Rahaman, "A review of strategies for improving the degradation properties of laminated continuous-fiber/epoxy composites with carbon-based nanoreinforcements," Carbon, vol. 50, no. 7. pp. 2377-2395, 2012;

A. Saib et al., "Carbon nanotube composites for broadband microwave absorbing materials," IEEE Trans. Microw. Theory Tech., vol. 54, no. 6, pp. 2745-2754, 2006;

F. Meng et al., "Graphene-based microwave absorbing composites: A review and prospective," Composites Part B: Engineering, vol. 137. pp. 260-277, 2018.

Several studies have investigated the use of graphene nanoplatelets (GNPs) or graphene oxide (GO) as nanofiller in glass-fibre composite to improve the mechanical properties, without any focus on the electrical or EM performances.

In R. Umer, Y. Li, Y. Dong, H. J. Haroosh, and K. Liao, "The effect of graphene oxide (GO) nanoparticles on the processing of epoxy/glass fiber composites using resin infusion," Int. J. Adv. Manuf. Technol., vol. 81, no. 9-12, pp. 2183-2192, 2015, GO-filled epoxy resin at 0.25 wt % of GO was used to produce the glass-fiber composite through liquid resin infusion.

The main difficulty of the process was to avoid formation of nanofiller agglomerates along the fiber texture.

A similar approach was investigated in N. T. Kamar, M. M. Hossain, A. Khomenko, M. Haq, L. T. Drzal, and A. Loos, "Interlaminar reinforcement of glass fiber/epoxy composites with graphene nanoplatelets," Compos. Part A Appl. Sci. Manuf, vol. 70, pp. 82-92, 2015, in which GO-filled epoxy resin was used to produce glass-fiber prepreg.

GNPs as reinforcement in glass fiber/epoxy composites were proposed in R. K. Prusty, S. K. Ghosh, D. K. Rathore, and B. C. Ray, "Reinforcement effect of graphene oxide in glass fiber/epoxy composites at in-situ elevated temperature environments: An emphasis on graphene oxide content," Compos. Part A Appl. Sci. Manuf., vol. 95, pp. 40-53, 2017. GNPs were initially dispersed in isopropanol and then brushed over the glass fabric, which was then used to produce the laminate composite through vacuum-assisted resin transfer molding.

The interfacial and mechanical properties of fiber-reinforced composites were improved through the use of GNPs or GOs as filler. This is disclosed in A. K. Pathak, M. Borah, A. Gupta, T. Yokozeki, and S. R. Dhakate, "Improved mechanical properties of carbon fiber/graphene oxide-epoxy hybrid composites," Compos. Sci. Technol., vol. 135, pp. 28-38, 2016; and W. Qin, F. Vautard, L. T. Drzal, and J. Yu, "Mechanical and electrical properties of carbon fiber composites with incorporation of graphene nanoplatelets at the fiber-matrix interphase," Compos. Part B Eng., vol. 69, 2015.

The aforementioned studies are focused only on the improvement of the mechanical property of the composite and not on the EM absorbing characteristics, aimed at the development of a RAS. Actually, the production of structural fibre-reinforced composite laminates with radar absorbing properties is still an open issue because in general satisfactory structural performances are achieved only at nanofiller concentration much lower than that corresponding to an improvement of EM absorption properties.

In previous studies, the authors have developed broadband EM absorbing panel made of graphene-filled epoxy or vinyl ester composite, but the produced prototypes of radar-absorbing material (RAM), did not perform as RAS. See, particularly:

M. S. Sarto, A. G. D'Aloia, A. Tamburrano, and G. De Bellis, "Synthesis, modeling, and experimental characterization of graphite nanoplatelet-based composites for EMC applications," IEEE Trans. Electromagn. Compat., vol. 54, no. 1, 2012;

A. G. D'Aloia, M. D Amore, and M. S. Sarto, "Adaptive Broadband Radar Absorber Based on Tunable Graphene," IEEE Trans. Antennas Propag., vol. 64, no. 6, 2016;

F. Marra et al., "Electromagnetic and dynamic mechanical properties of epoxy and vinylester-based composites filled with graphene nanoplatelets," Polymers (Basel)., vol. 8, no. 8, 2016.

The patent literature has many patents or patent applications concerning the development of structural components for aircraft or aeronautical applications made of composite laminates of carbon, Kevlar and/or glass fibers, and with improved structural properties due to the use of nanomaterials and carbon-based nanostructures. However, none of these patent publications concern the manufacture of structural radar-absorbing materials, as typically the structural property is combined with obtaining electromagnetic shielding properties but not electromagnetic absorption.

Specifically, patent publication EP 3050916 A1 describes a method for the production of a fiber- or nanofiber-reinforced polyamide film. The production process has not been designed to obtain a material with the simultaneous control of electromagnetic and mechanical properties, which is the purpose of the present invention. In addition, the process is limited to composites with a polyamide matrix, which is a thermoplastic polymer. The present invention, on the other hand, focuses on composites with an epoxy matrix, which, as is well known, involves considerable problems when used as a matrix in composites containing graphene nanoplatelets, due to the formation of agglomerates, and therefore is particularly critical when used to obtain radar-absorbing composites.

Patent publication EP 3235632 A1 concerns the production of a pre-impregnated composite sheet to obtain composite laminates with improved structural properties, and thus not a laminate composite with radar absorbency properties combined with the desired structural properties. It is well known that the dielectric permittivity properties of an uncured composite and cured composite are very different. It should also be noted that according to patent publication EP 3235632, obtaining the pre-impregnated sheet for the manufacture of structural laminated composites is based on the combination of a composite sheet of nanomaterials, a sheet of reinforcing fibers and a resin system. The composite sheet of nanomaterials comprises: a support sheet and a nanomaterial structure linked thereto. This nanomaterial structure may be a network of nanomaterials comprising at least one carbon nanomaterial and one boron nanomaterial. This allows a pre-impregnated conductive sheet to be obtained for electromagnetic shielding applications. It is known, however, that the sheet resistance values required to obtain electromagnetic shielding properties are well below the sheet resistance values required to obtain radar absorbency properties, which in effect are not considered in the patent.

Patent publication US 2004/0188890 A1 describes a process for the production of a composite laminate which comprises the pre-treatment of dry fibers with a coating of dispersed particles in an appropriate agent, the lamination of such treated fiber fabrics, the introduction of the polymer matrix (resin) and curing. The resulting composite has structural properties and electromagnetic shielding or electromagnetic absorption properties. However, the process described does not guarantee that the absorber will achieve broadband performance. Moreover, US 2004/0188890 A1 specifies that non-conductive fiber thicknesses must be close to a quarter of a wavelength.

Patent publication US 2011/0281034 A1 presents a method for reinforcing structural fiber composites by the dispersion between layers of carbon-based nanomaterials. According to such publication, the nanostructures are directly sprayed onto the dry fiber after appropriate dispersion only in solvent, without binding agent. This results in low mechanical and electromagnetic performance due to the resulting poor adhesion of the nanoplatelets to the dry fiber. The spraying is carried out in a vacuum.

Patent publication US 2013/0034724 A1 concerns making an interlayer containing nanostructures for the mechanical/structural reinforcement of structural composites. The radar absorbency properties are not mentioned or taken into account, as they would not be achievable by applying the described process.

Patent publication US 2015/0166743 A1 proposes, through the insertion of interlayers with conductive nanoparticles between one layer and another of a carbon fiber laminate, to obtain a final composite with structural properties and high conductivity in the plane orthogonal to the surface of the panel. The achievement of such performance is fundamental to producing composites with high electrical conductivity, which therefore withstand strong electromagnetic stresses, such as in the case of a direct lightning strike. The composites that may be obtained are not suitable for obtaining radar absorbency properties.

Patent publication KR 2013 0010285 A describes a method for mechanically and structurally reinforcing carbon fiber- or other fiber-laminated composites for electromagnetic shielding applications, and not for obtaining radar-absorbing composites. In addition, the nanomaterials are used to coat the fibers after dispersion in methanol without the use of binding elements, possibly deposited by spraying in a vacuum.

SUMMARY OF THE INVENTION

For aeronautical and aerospace applications and in general for the control of electromagnetic interference, of particular interest are broadband radar-absorbing composite materials with improved mechanical properties, wherein the thickness of the electromagnetic active component, i.e. the component that gives the material the property of absorbing electromagnetic radiation, is thin or less than the wavelength associated with the central frequency of the band of interest.

The present invention proposes an innovative methodology for the design and manufacture of a laminate structure in polymer matrix composite material containing graphene nanoplatelets with broadband radar radiation absorption properties and the desired mechanical or structural properties, comprising at least three basic blocks:

a first "back-reflecting" block, comprising material with high electrical conductivity, having an electromagnetic radiation reflection coefficient greater than −1 dB. Such block may be made from a thin metallic sheet or from an aeronautical carbon fiber laminate or from a structural metallic panel, and it is the part that gives the component the minimum desired mechanical or structural properties.

a second "electromagnetic absorber" block, comprising a plurality of sheets of non-conductive fiber coated for a fraction of its thickness with graphene-based nanomaterials, in such a way as to create a periodic multilayer structure alternating between conductive and non-conductive layers.

a third "impedance adapter" block, made of non-conductive material with a low loss factor, with a thickness of less than a quarter of the wavelength associated with the central frequency of the band of interest, which has the function of minimizing the reflection coefficient of the whole component in the desired absorption band by adapting the impedance of the component to the wave impedance of the incident electromagnetic field. This block may consist of a non-conductive, fiber composite laminate not containing graphene.

The second and third blocks form the active electromagnetic part of the component. The coupling of the second and third blocks gives the component object of the invention the property of broadband radar absorbency and at the same time mechanical or structural properties not less than the mechanical or structural properties of the first block.

Obtaining broadband electromagnetic absorption properties without compromising the mechanical or structural properties of the resulting structure is made possible by combining the manufacturing process of the second block, as described hereinafter, with the production process of the entire component complete with the three blocks, based on processes known per se in the art for the manufacture of aeronautical composite laminates.

According to a preferred embodiment, the production process of the second "electromagnetic absorber" block comprises the following steps:

1) Selection of the graphene-based nanomaterial. The nanomaterial used is made up of graphene nanoplatelets having a thickness in the range of 2 nm to 100 nm, however much less than the diameter of the fabric fibers and the distance between the bundles of weft and warp fibers, and lateral dimensions between 100 nm and 10 microns, however such as to allow the penetration of the graphene nanoplatelets between the bundles of weft and warp fibers of the reinforcement fabric for an appropriate thickness, which is linked to obtaining the desired electromagnetic properties of the second block and is between 5 microns and 150 microns. Graphene nanoplatelets may be produced with the desired dimensional geometrical properties by applying the procedure described for example in WO 2014/061048 A2, or they may be of a commercial type.

2) Dispersion of the graphene nanoplatelets in a diluted polymeric mixture consisting of solvent and polymer in an appropriate concentration defined in such a way as to obtain the desired rheological properties of the mixture that guarantee the optimal dispersion of the graphene nanoplatelets while avoiding the formation of agglomerates. The polymer used is preferably epoxy resin of the same type as that used for the subsequent production process of the final component consisting of the three blocks. The solvent must be compatible with the resin used; in the case of epoxy resin it is, for example, acetone. The volume/volume concentration of the liquid/solvent polymer solution must preferably be between 1% and 5%. The dispersion of the graphene nanoplatelets occurs by means of sonication with pulsed cycle sonotrode.

3) Deposition by air spraying of the suspension on one side or on both sides of the non-conductive dry fiber fabric, typically with a thickness between 150 μm and 300 μm. Preferably, the filaments of the fiber sheets have an electrical resistance greater than $10^4$ ohm*cm. For example, the fibers may be, by way of non-limiting example, glass, Kevlar, polyethylene or polyester. The spraying pressure, the distance of the nozzle from the fabric and the spraying cycle are fixed in such a way as to obtain:
   a. the desired concentration of graphene nanoplatelets per square meter of fabric, with values between 0.5 $g/m^2$ and 10 $g/m^2$,
   b. the desired depth of penetration of the nanostructures between the weft and warp fibers, with values between 5 and 150 microns and in any case with a penetration thickness that does not exceed half the thickness of the dry fiber fabric, typically between 100 and 300 microns,
   c. the desired thickness of the coating of resin/graphene nanoplatelet composite that is formed on the surface of the fibers of the fabric during the spraying stage. The thickness of this coating is between 10 and 200 microns, relative to the values of effective dielectric permittivity of the composite that one wishes to obtain.

The graphene nanoplatelets may be deposited uniformly on the surface of the dry fiber fabric. i.e. according to predefined spraying patterns in order to achieve a selective frequency behavior.

4) Manufacture of the lay-out of the second block by superimposing layers of dry fiber sprayed with the suspension of graphene nanoplatelets on one or both sides, interspersed with none or with some untreated dry fiber fabrics. The number of untreated dry fiber fabrics to be inserted between the layers of fabric treated with graphene nanoplatelets is directly linked to the frequency band within which radar-absorbing performance is required and is inversely proportional to the value of the central frequency of the absorption band of interest.

The third block, the impedance adapter, is made of a layer of, non-dispersive material of appropriate thickness, determined in such a way as to widen the electromagnetic absorption band according to the design specifications by minimizing the reflection coefficient of the entire component.

The third block is the one that, in the condition mounted on an aircraft, is in the most external or superficial and exposed position. The second block is intermediate. The first block is located in the innermost position of the aircraft.

A lay-up of the three blocks is then made, which are solidified by means of a resin-infusion process, in which unpolymerized thermosetting synthetic resin is infused in the lay-up thus obtained. Finally, heat and possibly pressure are applied so as to cause the polymerization of the thermosetting resin, obtaining a single-piece component of an aircraft with radar-absorbing properties.

Due to the method developed for the manufacture of the electromagnetic absorber layer, which uses limited quantities of nanofillers, it is possible to obtain conductive layers with optimal radar absorbency properties, and at the same time, the structural or mechanical properties of the component are not degraded.

The manufacturing procedure is simple and economical and is based on standard methods for the production of aeronautical composite laminates, preceded by a stage of functionalization of the dry fibers by air spraying polymeric suspensions of graphene nanoplatelets.

The second block creates a periodic stratification in which conductive layers containing graphene nanoplatelets alternate with subresonant non-conductive layers, since the distance between graphene nanoplatelets of two consecutive fiber sheets has a physical dimension of less than a quarter of the wavelength relative to the central frequency of the frequency band wherein the electromagnetic functioning of the multilayer laminate is envisaged. The multilayer laminate also has controlled mechanical properties suitable for use on aircraft.

The multi-layer sub-resonant structure of the electromagnetic absorber block allows excellent electromagnetic properties to be combined with mechanical or structural ones due to the low content of nanoplatelets which is preferably between 0.5% and 2% by weight.

BRIEF DESCRIPTION OF THE DRAWINGS

A possible embodiment of the manufacturing method according to the present invention, and of aircraft components obtained according to the present invention, will now be described by way of non-limiting example.

Reference is made to the accompanying drawings, wherein.

DETAILED DESCRIPTION

Figure 1:
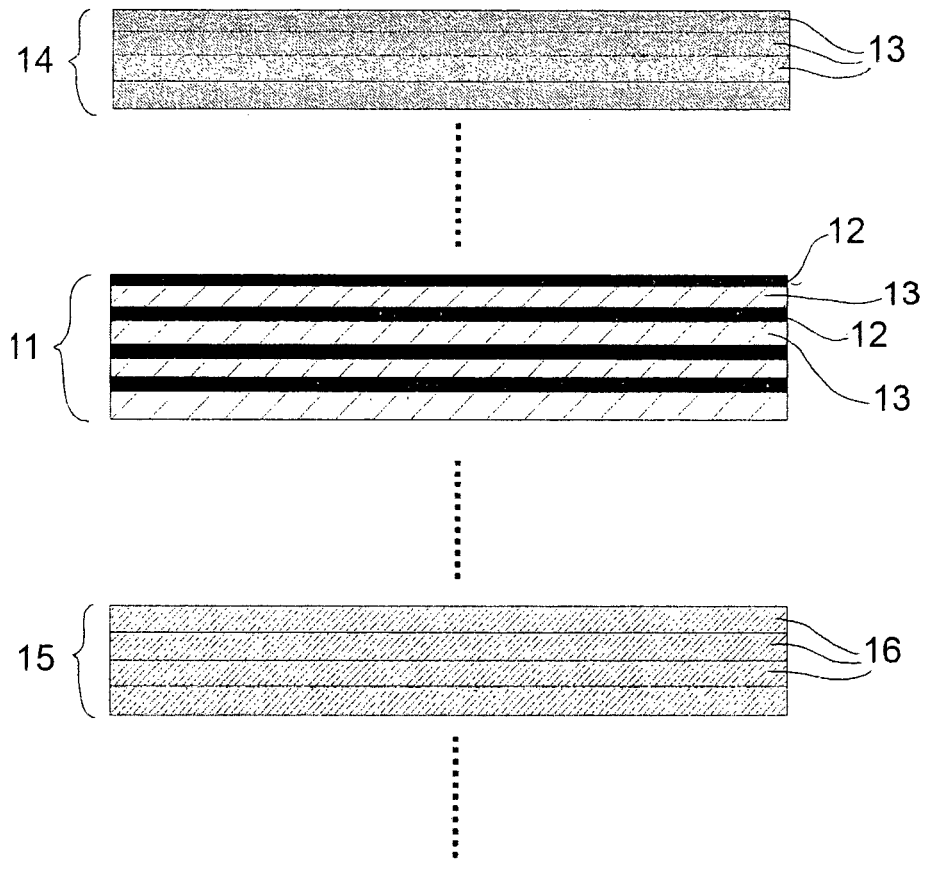
FIG. 1 is a schematic view in cross-section of a generalized lay-up of a component manufactured according to the present invention.

With reference to the drawings, some embodiments of methods for the manufacture of a generic aeronautical component with a laminated structure in polymeric matrix composite material containing graphene nanoplatelets will now be described. The structure comprises a plurality of juxtaposed blocks, with a first electrically conductive block 15, a second electromagnetic absorber block 11, and a third block 14 made of electrically non-conductive material.

The first "back-reflecting" block (indicated at 15 in FIG. 1), has high electrical conductivity, having an electromagnetic radiation reflection coefficient greater than −1 dB. The first block may, for example, be made from a thin metallic sheet or from an aeronautical carbon fiber laminate or from a structural metallic panel and is the part that gives the component the minimum desired mechanical or structural properties. Alternatively, the first back-reflecting block 15 may be formed from 1 to 24 sheets of fiber (16) that have no deposition of nanoplatelets and with a type of fiber with high electrical conductivity (e.g. CFC).

A production process of the second block 11 "electromagnetic absorber" (FIG. 1) preferably consists of the following steps. According to a first embodiment, a plurality of dry fiber sheets is prepared, on which graphene nanoplatelets are deposited. In the selection of the graphene-based nanomaterial, the nanomaterial used is preferably composed of graphene nanoplatelets having a thickness in the range of 2 nm to 100 nm, but less than the diameter of the fabric fibers of the fiber sheets and the distance between the bundles of weft and warp fibers. Such distance is generally between 100 nm and 10 microns, so that graphene nanoplatelets may penetrate between the weft and warp fiber bundles of the reinforcement fabric for the desired thickness. The thickness penetrated by the graphene nanoplatelets is linked to obtaining the desired electromagnetic properties of the second block, and is between 5 and 150 microns. Graphene nanoplatelets may be produced with the desired dimensional geometrical properties by applying the procedure described for example in WO 2014/061048 A2, or they may be of a commercial type.

The sheets of reinforcing fibers, for example, may be made of glass and/or Kevlar, polyethylene or polyester fibers, in a matrix of artificial thermosetting resin, for example, epoxy resin.

Preferably, the filaments of the fiber sheets have an electrical resistance greater than $10^4$ ohm*cm.

To improve the adhesion of the graphene nanoplatelets to the fibers, the nanoplatelets may be dispersed in resin, preferably epoxy resin of the same type as that used for the subsequent infusion, diluted in solvent, such as acetone or MEK. For example, an epoxy resin with an optimized viscosity/temperature profile may be used to allow injection from 70° C. (158° F.) and the viscosity of which decreases as a result of injection below 20 cP (centiPoise).

The dispersion of the graphene nanoplatelets in a diluted polymeric mixture consisting of solvent and polymer is carried out in a concentration defined in such a way as to obtain the desired rheological properties of the mixture that guarantee the optimal dispersion of the graphene nanoplatelets while avoiding the formation of agglomerates. The polymer used is preferably epoxy resin of the same type as that used for the subsequent production process of the final component consisting of the three blocks. The solvent must be compatible with the resin used; in the case of epoxy resin it is, for example, acetone. The volume/volume concentration of the liquid/solvent polymer solution is preferably between 1% and 5% of resin relative to the total volume of solvent used in a subsequent spraying stage, wherein the polymeric mixture containing the graphene nanoplatelets is deposited on the fiber sheets.

The dispersion of the graphene nanoplatelets in the polymeric mixture may preferably occur by sonication with pulsed cycle sonotrode.

If a tackifier-compatible resin is used, a mixing ratio of 1 to 3 by weight tackifier/solvent is preferable. In case of dispersion of the nanoplatelets on the carbon fiber, in order to improve the visibility of the sprinkling, it is possible to add to the mixture a red dye compatible with the epoxy resin in a proportion of 2+/−0.5 g per liter of mixture.

The individual graphene nanoplatelets that are deposited may have a thickness between 30 nm and 70 nm and lateral dimensions between 5 μm and 20 μm.

Depositions of nanoplatelets on fiber sheets may have weight values between 0.5 $g/m^2$ and 10 $g/m^2$.

The dry fiber sheets on which the graphene nanoplatelets are deposited are preferably between 150 μm and 300 μm thick.

Preferably, the filaments of the fiber sheets have an electrical resistance greater than $10^4$ ohm*cm. The fibers may comprise, by way of non-limiting example, glass, Kevlar, polyethylene or polyester fiber.

The deposition of the solution containing the graphene nanoplatelets may be carried out by means of an XY plotter equipped with an airbrush and operated by a servomotor. With this type of device, it is possible to adjust the speed of the plotter and the air pressure of the airbrush in order to properly calibrate the quantity of graphene sprayed (weight and/or thickness) per unit of surface of the fiber sheet, and the degree of surface coverage.

In some embodiments, the deposition of graphene nanoplatelets may occur evenly over the surface of the dry fiber fabric. More specifically, in some embodiments, deposited nanoplatelets may extend to form continuous layers, for example when an exclusively resistive surface layer is desired.

According to other embodiments, the deposition of graphene nanoplatelets on the surface of dry fiber fabric takes place in accordance with predefined spraying patterns in order to obtain a selective frequency behavior, depending on the specific frequency band of the radiation subject to absorption and the expected performance of the radar-absorbing composite.

In the lay-up preparation, in order to guarantee the spatial isotropy of the fibers and thus to obtain a composite material with electromagnetic and mechanical isotropic properties, according to a possible embodiment of the method, the dry fiber sheets may be combined by stacking them and arranging them with crossed orientations [0°, +45°, 90°, −45°, 0° . . . ]. Other possible embodiments of the method include orientation of the fibers of the quasi-isotropic or non-isotropic type. The second "electromagnetic absorber" block indicated at 11 in FIG. 1, may be obtained by producing from 1 to 24 graphene depositions, indicated at 12 in FIG. 1, with concentrations belonging to the ranges defined above, on sheets 13 of dry fiber with properties and thicknesses previously specified.

The deposition by air spraying of the suspension may occur on one side or on both sides of the non-conductive dry fiber fabric, typically with a thickness between 150 μm and 300 μm.

The spraying pressure, the distance of the fabric from the nozzle and the spraying cycle may be adjusted in such a way as to obtain:
a. the desired concentration of graphene nanoplatelets per square meter of fabric, with values between 0.5 g/m2 and 10 g/m2,
b. the desired depth of penetration of the nanostructures between the weft and warp fibers, with values between 5 and 150 microns and in any case with a penetration thickness that does not exceed half the thickness of the dry fiber fabric, typically between 100 and 300 microns.
c. the desired thickness of the coating of resin/graphene nanoplatelet composite that is formed on the surface of the fibers of the fabric during the spraying stage. The thickness of this coating is between 10 and 200 microns relative to the values of effective dielectric permittivity of the composite that one wishes to obtain.

In the manufacture of the second block, which occurs by superimposing layers of dry fiber sprayed with the suspension of graphene nanoplatelets on one or both sides, the sprayed sheets may be interspersed with one or more untreated (unsprayed) dry fiber fabrics. The number of untreated dry fiber fabrics to be inserted between the layers of fabric treated with graphene nanoplatelets is directly linked to the frequency band within which radar-absorbing performance is required and is inversely proportional to the value of the central frequency of the absorption band of interest.

The third block 14, the impedance adapter, is made of a layer of non-dispersive material of appropriate thickness, determined in such a way as to widen the electromagnetic absorption band according to the design specifications by minimizing the reflection coefficient of the entire component.

The three types of blocks made may be suitably combined according to the generalized lay-up diagram shown in FIG. 1. First, the number of high conductivity fiber sheets (e.g. CFC) required to obtain the desired mechanical and/or structural properties may be laid; then the desired number of low-conductivity, radar-absorbing fiber sheets may be laid with graphene depositions of the appropriate weight; finally, the desired number of low-conductivity fiber sheets may be laid without graphene depositions.

Once the lay-up has been prepared, according to the generalized diagram described above, a vacuum bag may be applied according to standard Liquid Resin Infusion methods and methods for the infusion of the resin (FIG. 3) using technologies that are known per se.

The standard injection/suction pressure values of the pump used in the process are preferably, by way of non-limiting example, between 0.3 bar and 0.9 bar, for infusion temperature values between 80° and 120° C.

Figure 4:
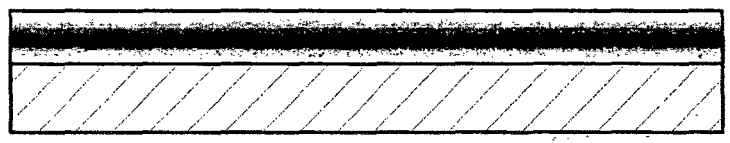
FIG. 4 schematically illustrates the detail of a section of a finished component, relative to a single sheet of fiber.

FIG. 4 shows schematically in cross-section the penetration of the post-infusion graphene on a single sheet of dry glass fiber with a thickness of 250 microns. In the specific example in FIG. 4, the surface layer of glass fiber impregnated with graphene is about 75 microns thick, and the underlying layer of glass fiber impregnated with only epoxy resin is about 175 microns thick.

Figure 2:
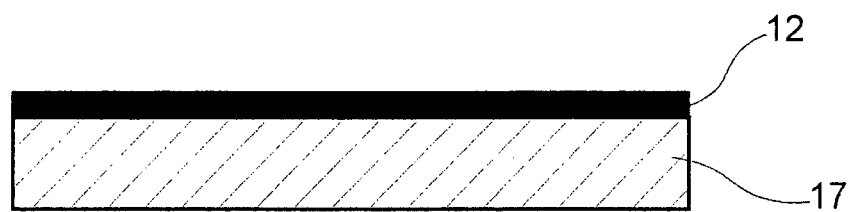
FIG. 2 illustrates in cross-section the detail relating to the deposition of the solution containing the graphene nanoplatelets on a single sheet of dry fiber before the infusion of the resin in the lay-up (first embodiment) or the pre-impregnation method of the dry sheet (third embodiment)
Figure 3:
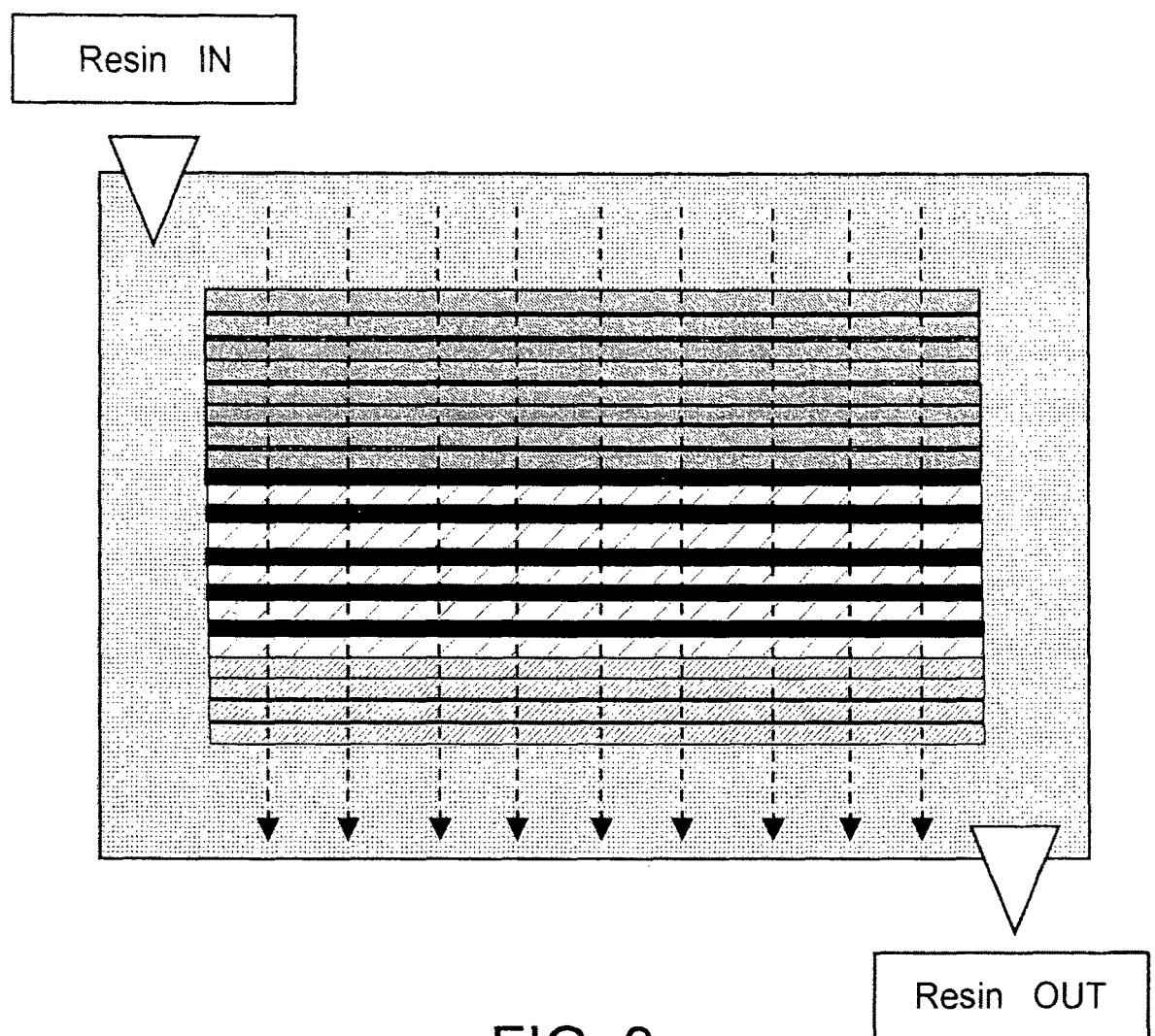
FIG. 3 provides a schematic illustration of the resin infusion process.
Figure 5:
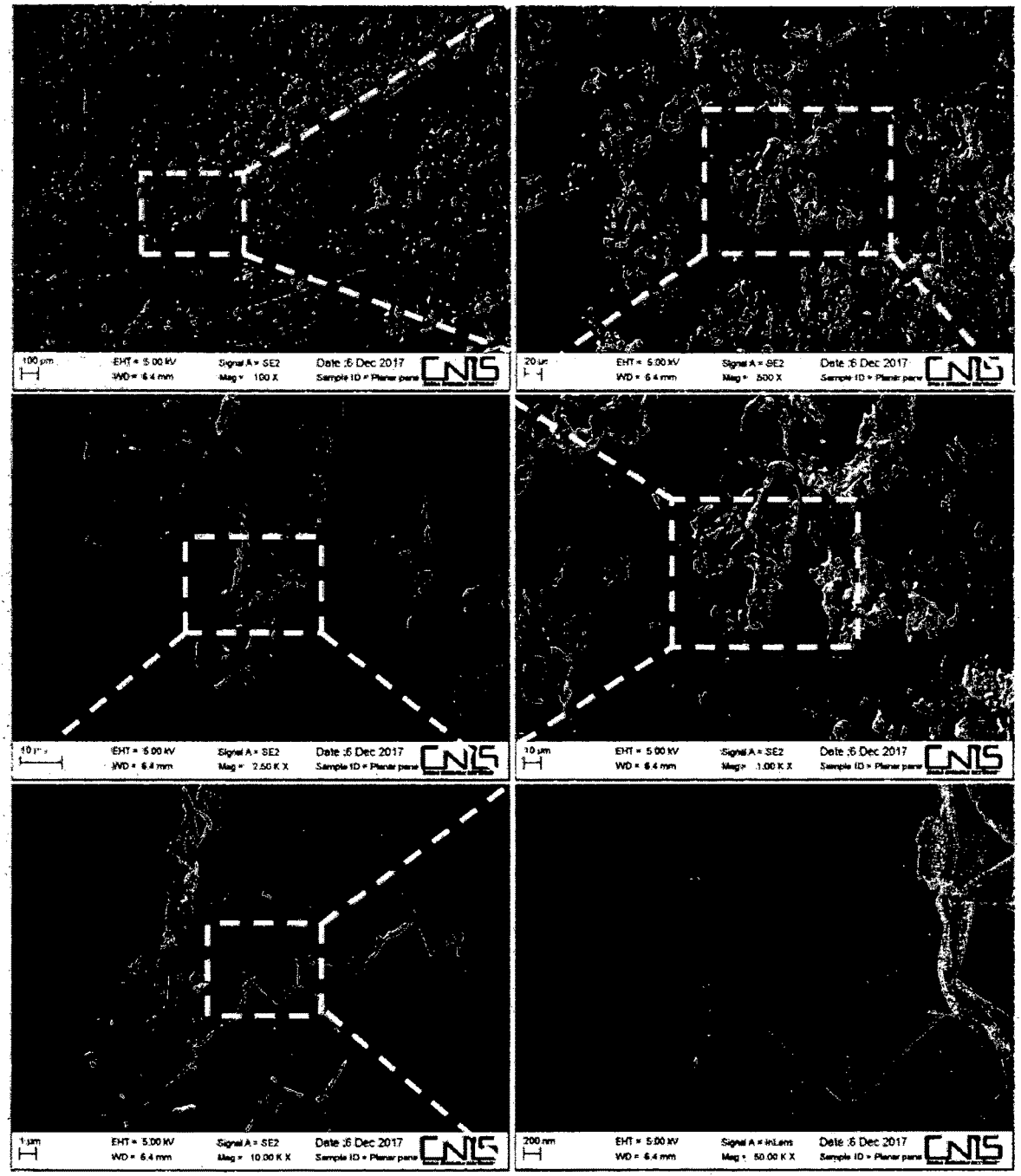
FIG. 5 shows a series of SEM micrographs at increasing magnifications of the glass fiber fabric surface after spraying the GNPs, before infusion with epoxy resin.
Figure 6:
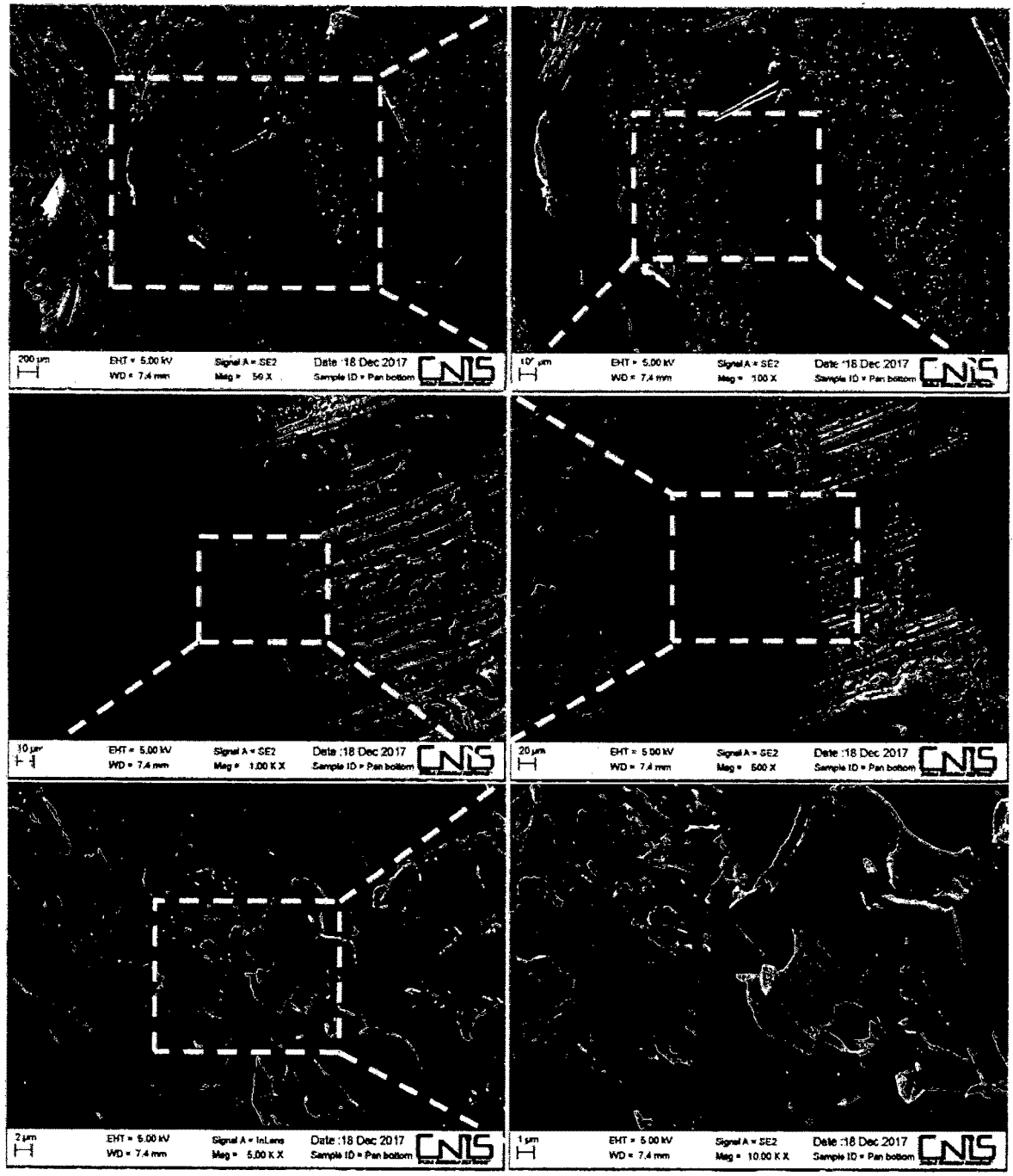
FIG. 6 shows a series of SEM micrographs at increasing magnifications of the surface of the section of a panel with detail indicating the penetration of GNPs through the weft and warp of a same layer of fabric.

Experimental tests carried out by the Applicant have shown, also by means of scanning electron microscopy SEM analyses of which some illustrative images are reported in FIGS. 5 and 6, that following the resin infusion process, carried out with the parameters detailed above, the surface depositions of graphene, having an initial surface thickness between 10 micrometers and 100 micrometers, by virtue of the transverse flow of the resin, penetrate between the fibers to a depth of between 5 micrometers and 150 micrometers, as schematically indicated in FIGS. 2, 3, 4 and integrate uniformly, without the formation of agglomerates of nanoparticles, thus ensuring controllable electromagnetic as well as mechanical properties of the product.

The process initially provides for the preparation of a layer of dry fiber, for example glass fiber (indicated at 17 in FIG. 2) with a thickness of 250 microns. A surface layer (12) of the solution containing graphene nanoplatelets may then be deposited on the glass fiber layer (17).

Depositions may be continuous or discrete, depending on the performance required from the material. This results in a dry preform. The procedure is repeated N times until the desired lay-up is obtained, of which a generalized version is shown in FIG. 1, preliminarily defined and optimized by means of an electromagnetic calculation code that defines the performance and thicknesses of the individual blocks making up the radar-absorbing composite.

The dry preform is covered with a vacuum bag, which is sealed around the perimeter of the preform. The air is evacuated from the preform, and then the resin is introduced. The resin is forced to penetrate the preform because of the pressure difference between the atmospheric pressure acting on the resin and the vacuum level in the preform. Finally, a heat and pressure polymerization cycle is applied, which causes the resin to solidify.

At the end of the polymerization cycle, a component made of composite material is obtained having, for each fiber sheet constituting the elementary radar-absorbing block, a surface layer of between 50 and 150 microns of glass fiber impregnated with resin and graphene. The underlying layer is made of resin-impregnated glass fiber, undoped, i.e. without graphene.

Experiments have shown that by appropriately varying the process parameters, such as weight and type of fiber, suspension concentration, deposition technology, infusion and cure conditions, it is possible to vary the depth of penetration of the graphene, thus varying the equivalent electromagnetic properties of the graphene-impregnated layers and consequently the overall performance of the reflection coefficient of the composite.

Figure 7:
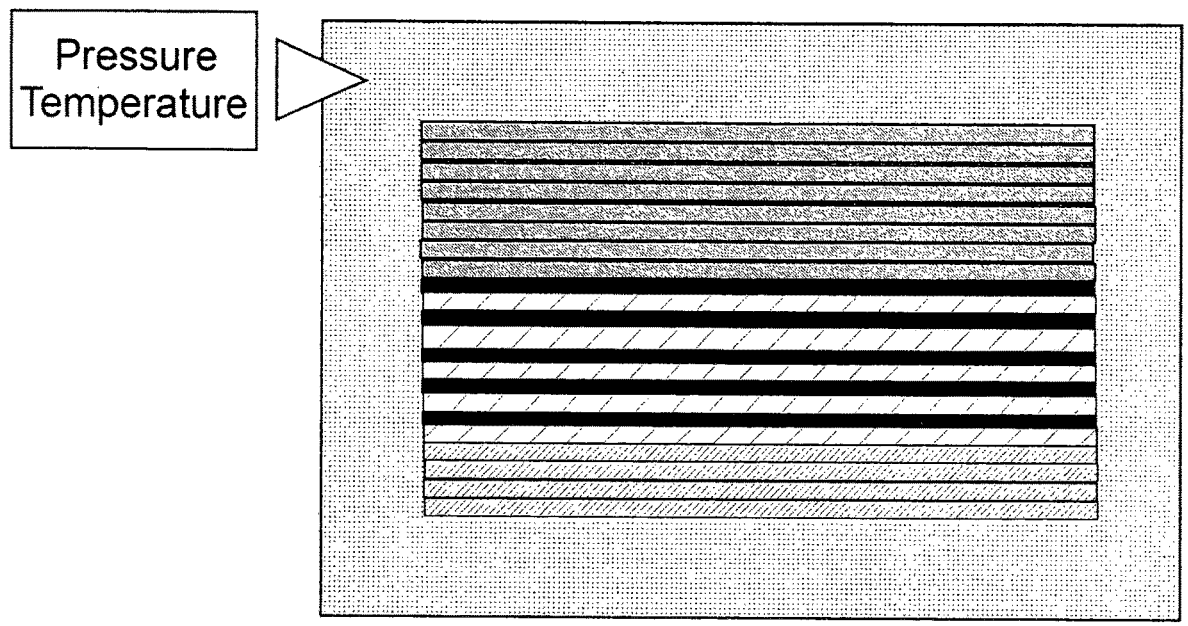
FIG. 7 shows a diagram relating to the application of the autoclave treatment cycle on the lay-up prepared with graphene depositions made directly on the pre-preg sheets.

In a second embodiment of the method for the manufacture of the second block, the depositions of the nanoplatelets, where provided, are made directly on the low electrical conductivity fiber sheets already pre-impregnated. In such an embodiment, therefore, following the autoclave treatment process of the prepared lay-up, the graphene nanoparticles remain confined in the resin matrix within the thickness between two sheets of adjacent prepregs, with a limited integration of the graphene with the fibers relative to the first embodiment, as shown schematically in FIG. 7.

In a third embodiment of the method for the manufacture of the second block, the prepreg sheets are made downstream of the dispersion of the solution containing the nanoparticles on the dry fiber with the same specifications and methods described, ensuring the same range of depth of penetration into the fibers as detailed above.

Regardless of the specific embodiment of the method, from the electromagnetic point of view, through the method according to the present invention and the contextual design of the lay-up, a "Jaumann Absorber" is essentially made with an impedance adapter wherein conductive layers (due to the penetration and uniform integration of graphene in the fiber and resin) and non-conductive layers (impregnated glass fiber) alternate. The proposed design is different from the standard version of the "Jaumann Absorber" known in the literature, through the insertion, according to an aspect of the present invention, of a suitably designed impedance adapter formed by a succession of layers of non-conductive and undoped fiber, and by the fact that the layers that make up the structure have sub-resonant thicknesses, thus creating a monodimensional metamaterial.

Application Example 1: Obtaining a Radar-Absorbing Composite by Means of "Liquid Resin Infusion"

In the present example, the specifications of a possible composite material are detailed, usable for the manufacture of an aircraft component, with inclusions of graphene nanoplatelets having an overall thickness of 5 mm and which guarantees, relative to an equivalent thereof without nanoparticle insertions, a reflection coefficient of less than −15 dB in the frequency band between 8 and 14 GHz.

To this end, the following types of constituent materials are provided:
- a 1 mm thick "absorbent radar" block made up of 4 sheets of dry E-Glass fiber of an average thickness of 250 microns with surface depositions of graphene of 3 g/m$^2$
- a 3 mm "impedance adapter" block made up of 8 sheets of Electric-glass-type dry fiber with an average thickness of 250 microns and 5 sheets of Dielectric-glass-type dry fiber with an average thickness of 200 microns.
- a "standard" block of 1 mm made up of 4 sheets of dry CFC fiber (carbon fiber composite) of the "woven" type with an average thickness of 250 microns.

Once the lay-up and vacuum bag had been prepared, the epoxy resin infusion method provided for in the Liquid Resin Infusion process was used and modified appropriately as described above.

Figure 8:
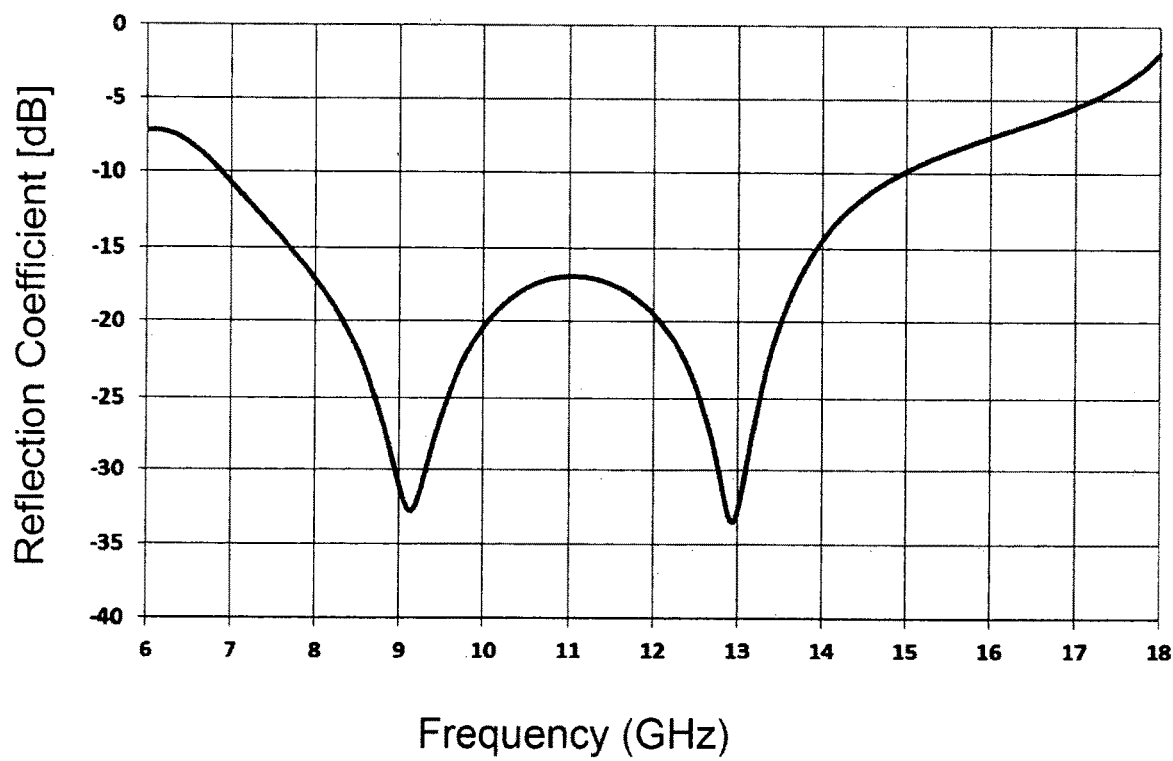
FIG. 8 shows the measurement of the reflection coefficient of a possible material made by a method according to the present invention.

The electromagnetic attenuation of the product panel is measured by the Applicant according to the "NRL arch" setup. The attenuation performance obtained is shown in FIG. 8.

The insertion of nanoplatelets, according to the present invention, does not involve an appreciable increase in production costs of the component and is easy to implement/integrate into the industrial processes currently used. The result is a component made of multifunctional composite with a negligible weight gain, having substantially the same mechanical properties as a corresponding graphene-free component.

In particular, the present invention allows a remarkable flexibility of application to be achieved, concentrating the graphene nanoplatelets in the areas of the component where the effect of radar absorbency is effectively more necessary.

The method further allows the dosage of graphene nanoplatelets to vary from area to area, depending on the electromagnetic design in order to obtain a component having predetermined features of low observability. For example, concentrations or percentages of decreasing weight may be applied with the depth, i.e. progressively less towards the inside of the component. There is the possibility of adjusting the thickness of the graphene layer, for example between 50 and 150 microns, between two consecutive layers of fibers.

The greater uniformity of distribution of the doping component (graphene nanoplatelets), without the formation of aggregates with respect to other nanomaterials (e.g. carbon nanotubes), both within the structural reinforcement fibers and in the resin, ensures an adequate homogeneity of the electromagnetic properties of the material.

It is specified that preferably, but not exclusively, the doping material is applied on several layers of dry fibers of the reinforcement material through the use of an automatic spraying system made with an XY plotter and an airbrush driven by a servomotor. One then stacks the "doped" layers according to the sequence and the guidelines of the project and, subsequently, after the application of the vacuum bag, proceeds with the infusion of liquid resin and the polymerization thereof with the application of heat and pressure.

The main advantage of the first embodiment based on the liquid resin infusion process is related to the possibility of doping the "dry" reinforcement fibers appropriately before the subsequent resin infusion. This allows a lay-up to be formed with a succession of reinforcement fibers with different doping weights, i.e. with a differentiated concentration of graphene in the thickness, allowing the optimization of the electromagnetic absorbency property of the final component.

As an alternative to the "resin film infusion" technique, which provides for laminating a preform with dry sheets or cloths (plies), it is possible to prepare the component by laminating sheets (called "prepregs") already pre-impregnated with unpolymerized thermosetting synthetic resin that serves as a matrix. In such an embodiment, the graphene nanoplatelets may, be applied to individual prepreg sheets prior to the lamination thereof. The laminated and prepreg sheets may then be coated with a vacuum bag to remove the air, and then introduced into an autoclave, applying heat and pressure so as to cause the polymerization of the thermosetting resin matrix and give the laminated layers the desired shape.

As may be appreciated, multilayer laminated composites with polymeric matrix according to the present invention acquire improved radar-absorbing properties but at the same time have mechanical or structural properties that are unchanged or improved compared to similar components made with known manufacturing processes.

One may appreciate that the present process allows aircraft components with very complex geometric shapes to be made, such as the leading edge and curved panels of the fuselage or nacelles, or panels of wingboxes and tail empennages.

Different aspects and embodiments of methods for the manufacture of radar-absorbing components for aircraft have been described. The invention, moreover, is not limited to the described embodiments, but may vary within the scope defined by the accompanying claims. For example, the shape, size and specific lay-up of the fiber part may vary. Likewise, also the number of plies, their thickness, the distribution and the local concentrations of graphene may vary.

What is claimed is:

1. A multilayer radar-absorbing laminate made of composite material with polymeric matrix containing graphene nanoplatelets for use on an aircraft, wherein the multilayer radar-absorbing laminate comprises a plurality of juxtaposed blocks, the plurality of juxtaposed blocks including:
   a first electrically conductive block to be placed in use toward the inside of the aircraft, having an electromagnetic radiation reflection coefficient greater than −1 dB;
   a second intermediate electromagnetic absorber block, comprising a stack of electrically non-conductive dry fiber sheets, wherein each electrically non-conductive dry fiber sheet is at least partially permeated with the graphene nanoplatelets, to achieve a periodic and electromagnetically subresonant layer in which conductive layers containing the graphene nanoplatelets alternate with non-conductive layers;

a third block of electrically non-conductive material to be arranged toward the outside of the aircraft in use and forming part of an outer surface of the aircraft;

wherein the second intermediate electromagnetic absorber block is obtainable by a process comprising the steps of:

a) providing the graphene nanoplatelets with a thickness between 2 nm and 100 nm and lateral dimensions between 100 nm and 10 microns;

b) dispersing the graphene nanoplatelets in a polymeric mixture consisting of a solvent and a polymer, to obtain a suspension of the graphene nanoplatelets in the polymeric mixture;

c) depositing by air spraying the suspension of the graphene nanoplatelets on one or both opposite sides of the electrically non-conductive dry fiber sheets, with controlled penetration of the graphene nanoplatelets into the respective electrically non-conductive dry fiber sheets; and d) forming the second intermediate electromagnetic absorber block by overlapping a plurality of electrically non-conductive dry fiber sheets sprayed with the suspension of the graphene nanoplatelets; and wherein forming the second intermediate electromagnetic absorber block is followed by the steps of:

e) executing a lay-up including the first electrically conductive block, the second intermediate electromagnetic absorber block, and the third block of electrically non-conductive material;

f) infusing unpolymerized thermosetting synthetic resin into the lay-up thus obtained; and g) applying heat and, if necessary, pressure to cause polymerization of the thermosetting synthetic resin and homogeneous and uniform distribution of the graphene nanoplatelets within a thickness portion of the electrically non-conductive dry fiber sheets forming the second intermediate electromagnetic absorber block.

2. The multilayer radar-absorbing laminate of claim 1, wherein, during the step of forming the second intermediate electromagnetic absorber block, the electrically non-conductive dry fiber sheets sprayed with the suspension of the graphene nanoplatelets are interspersed with one or more electrically non-conductive dry fiber sheets not sprayed with the suspension of the graphene nanoplatelets.

3. The multilayer radar-absorbing laminate of claim 1, wherein the graphene nanoplatelets are distributed on the electrically non-conductive dry fiber sheets according to values between 0.5 g/m² and 10 g/m², per square meter of fiber sheet.

4. The multilayer radar-absorbing laminate of claim 1, wherein the graphene nanoplatelets uniformly penetrate each electrically non-conductive dry fiber sheet for a penetration thickness between 5 and 150 microns and not exceeding half a thickness of the electrically non-conductive dry fiber sheet.

5. The multilayer radar-absorbing laminate of claim 1, wherein the electrically non-conductive dry fiber sheets each have a thickness of between 150 µm and 300 µm.

6. The multilayer radar-absorbing laminate of claim 1, wherein during depositing by air spraying the suspension of the graphene nanoplatelets, the suspension of the graphene nanoplatelets forms a coating with a thickness between 10 and 200 microns on a surface of the electrically non-conductive dry fiber sheet.

7. The multilayer radar-absorbing laminate of claim 1, wherein filaments of the electrically non-conductive dry fiber sheets have an electrical resistance greater than $10^4$ ohms*cm.

8. The multilayer radar-absorbing laminate of claim 1, wherein the electrically non-conductive dry fiber sheets are selected from the group consisting of: glass fibers, Kevlar fibers, polyester fibers, and polyethylene fibers.

9. The multilayer radar-absorbing laminate of claim 1, wherein a volume/volume concentration of a liquid/solvent polymer solution is between 1% and 5%.

10. The multilayer radar-absorbing laminate of claim 1, wherein dispersion of the graphene nanoplatelets in the polymeric mixture occurs by sonication with pulsed cycle sonotrode.

11. The multilayer radar-absorbing laminate of claim 1, wherein on at least one of the electrically non-conductive dry fiber sheets the graphene nanoplatelets are evenly distributed within the thickness portion of the electrically non-conductive dry fiber sheets.

12. The multilayer radar-absorbing laminate of claim 1, wherein on at least one same sheet of at least one of the plurality of electrically non-conductive dry fiber sheets, the graphene nanoplatelets are distributed unevenly, according to a predetermined pattern or gradient.

13. The multilayer radar-absorbing laminate of claim 1, wherein the polymer used in the polymeric mixture is epoxy resin of the same type as that used for a subsequent production process of a final component consisting of the three blocks.

14. The multilayer radar-absorbing laminate of claim 1, wherein the graphene nanoplatelets are applied with higher concentrations on the electrically non-conductive dry fiber sheets closer to an outer surface of a final component that comprises said plurality of juxtaposed blocks than to the electrically non-conductive dry fiber sheets located further away from the outer surface.

15. The multilayer radar-absorbing laminate of claim 1, wherein the first electrically conductive block consists of one of the following: at least one metallic sheet, one carbon fiber laminate, or at least one structural metallic panel.

16. The multilayer radar-absorbing laminate of claim 1, wherein the third block of electrically non-conductive material comprises a non-conductive fiber composite laminate not containing graphene.

* * * * *